United States Patent
Ito et al.

(10) Patent No.: US 7,969,529 B2
(45) Date of Patent: Jun. 28, 2011

(54) LIQUID CRYSTAL DISPLAY DEVICE USING EXTERNAL ELECTRODE FLUORESCENT LAMPS

(75) Inventors: Yoichi Ito, Kawasaki (JP); Naotoshi Sumiya, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 743 days.

(21) Appl. No.: 11/892,237

(22) Filed: Aug. 21, 2007

(65) Prior Publication Data
US 2008/0252810 A1 Oct. 16, 2008

(30) Foreign Application Priority Data
Sep. 4, 2006 (JP) .................... 2006-238544

(51) Int. Cl.
*G02F 1/1335* (2006.01)
*G02F 1/1333* (2006.01)
(52) U.S. Cl. ............ 349/61; 349/58; 362/632; 362/633; 362/634
(58) Field of Classification Search .......... 632/632–634; 349/61, 58
See application file for complete search history.

(56) References Cited

U.S. PATENT DOCUMENTS

| 6,661,181 | B2 | 12/2003 | Shin |
| 6,984,056 | B2 | 1/2006 | Amano et al. |
| 7,625,112 | B2 * | 12/2009 | Ko et al. ................ 362/633 |
| 2005/0265047 | A1 | 12/2005 | Yun et al. |
| 2006/0038934 | A1 * | 2/2006 | Morishita et al. ........... 349/58 |
| 2007/0121344 | A1 * | 5/2007 | Chang .................... 362/632 |

\* cited by examiner

*Primary Examiner* — Nathanael R Briggs
(74) *Attorney, Agent, or Firm* — Stites & Harbison PLLC; Juan Carlos A. Marquez, Esq.

(57) ABSTRACT

A backlight structural body of a liquid crystal display device includes, between a back plate and a frame-like mold frame, a plurality of external electrode fluorescent lamps which is arranged in parallel to each other and a pair of side frames which includes electricity supply terminals which electrically connect electrode portions of the plurality of external electrode fluorescent lamps in parallel to each other. The side frame is constituted of a lower side frame which fixes the electricity supply terminals and an upper side frame which is assembled to the lower side frame while covering the electrode portions of the external electrode fluorescent lamps which are connected to the electricity supply terminals. The upper side frame includes eaves which project in the longitudinal direction of the external electrode fluorescent lamps in a state that the eaves individually cover the respective electrode portions of the external electrode fluorescent lamps.

7 Claims, 6 Drawing Sheets

LIQUID CRYSTAL DISPLAY DEVICE USING EXTERNAL ELECTRODE FLUORESCENT LAMPS

The present application claims priority from Japanese applications JP2006-238544 filed on Sep. 4, 2006, the content of which is hereby incorporated by reference into this application.

BACKGROUND OF THE INVENTION

1. Field of the Invention

The present invention relates to a liquid crystal display device, and more particularly to a backlight structural body which uses an external electrode fluorescent lamp (EEFL).

2. Description of the Related Art

A liquid crystal display device has been widely spreading as a display device of a television receiver set or an information terminal. Usually, in the liquid crystal display device of this type which is relatively large in size and has a screen which is required to exhibit high brightness, as a backlight structural body which constitutes an auxiliary illumination device of the liquid crystal display device, there is adopted a so-called direct-light-type backlight structural body which arranges a plurality of linear light sources on a back surface of a liquid crystal display panel thus directly radiating light from the linear light sources to the back surface of the liquid crystal display panel. Here, the term "direct-light-type" is the expression which contrasts with a so-called side-light-type backlight structural body which performs illumination by mounting a similar linear light source on a side of a light guide plate which is arranged on a back surface of a liquid crystal display panel.

In the direct-light-type backlight structural body, a cold cathode fluorescent lamp (CCFL) has been popularly used as a linear light source. In general, in the inside of the direct-light-type backlight structural body, a plurality of CCFLs is arranged in parallel. However, with respect to the CCFLs, one inverter circuit is directly connected to one or two CCFLs and hence, it is necessary to wire lines from the respective CCFLs to the inverter circuit thus requiring complicated wiring. As an example which describes such a constitution, patent document 1 described below is named.

Recently, in place of the CCFLs, an external electrode fluorescent lamp (EEFL) has begun to be used. Different from the existing CCFL, the EEFL has an electrode outside a lamp and hence, in addition to an advantage that the connection is easy, a plurality of fluorescent lamps can be connected in parallel to the inverter circuit. Accordingly, in the EEFL, by making use of this parallel connection, the connection from the respective lamps to the inverter circuit can be realized using a common line thus reducing the number of lines. Further, the number of inverter circuits which the EEFL uses is smaller than the number of inverter circuits which the CCFL uses. As examples which use such an EEFL, patent document 2 and patent document 3, described below are named.

Patent Document 1: JP-A-2002-231034
Patent Document 2: JP-A-2005-347259
Patent Document 2: JP-A-2004-164907

SUMMARY OF THE INVENTION

An external electrode of the external electrode fluorescent lamp is characterized in that the longer a lamp length of the external electrode fluorescent lamp, a length of a forming region in the lamp axial direction is increased. To match a light emitting region of the external electrode fluorescent lamp with a display region of the liquid crystal display panel, a width of an outer periphery (picture frame) which the region of the external electrode occupies is increased and hence, the brightness in regions at both ends of the external electrode fluorescent lamp is lowered. The larger a size of the liquid crystal display device, this phenomenon becomes more conspicuous. This implies that it is difficult to satisfy a demand for narrow picture frame in recent years. To satisfy the demand for the narrow picture frame, it is necessary to arrange a portion of the external electrode of the external electrode fluorescent lamp within a display region inside a picture frame region. In this case, an external electrode region within the display region constitutes a non-light-emitting region thus lowering the brightness.

Accordingly, it is an object of the present invention to provide a liquid crystal display device which can, when an external electrode portion of an external electrode fluorescent lamp is arranged within a display region of a liquid crystal display panel, realize the narrowing of a picture frame by effectively reducing the generation of brightness irregularities attributed to lowering of the brightness of the external electrode region.

The liquid crystal display device of the present invention is constituted of a liquid crystal display panel and a backlight structural body which is mounted on a back surface of the liquid crystal display panel. The backlight structural body includes, between a back plate and a frame-like mold frame, a plurality of external electrode fluorescent lamps which is arranged in parallel to each other and a pair of side frames which includes electricity supply terminals which electrically connect external electrodes (electrode portions) of the plurality of external electrode fluorescent lamps in parallel to each other. The side frame is constituted of a lower side frame which fixes the electricity supply terminals and an upper side frame which is assembled to the lower side frame while covering the electrode portions of the external electrode fluorescent lamps which are connected to the electricity supply terminals.

To achieve the above-mentioned object, the present invention is characterized in that the upper side frame includes eaves which project in the longitudinal direction of the external electrode fluorescent lamps in a state that the eaves individually cover the respective external electrodes of the external electrode fluorescent lamps.

Further, the present invention is also characterized in that the upper side frame includes inclined portions which extend more downwardly than arrangement surfaces of the plurality of external electrode fluorescent lamps between the plurality of external electrode fluorescent lamps.

Further, the eaves and the inclined portions formed on the upper side frame may be combined with each other. These eaves and inclined portions may adopt various constitutions and shapes and typical examples are explained in embodiments described later.

The above-mentioned eaves and inclined portions formed on the upper side frame have a function of improving the brightness of an external electrode region and can realize the liquid crystal display device which exhibits the favorable brightness distribution over the whole surface of a display region without requiring a wide picture frame of the liquid crystal display panel. Here, the eaves can also have, in addition to the function of improving the brightness of the external electrode region, a function of preventing an electric shock due to a high voltage applied to the external electrode.

DESCRIPTION OF THE PREFERRED EMBODIMENTS

Figure 1:
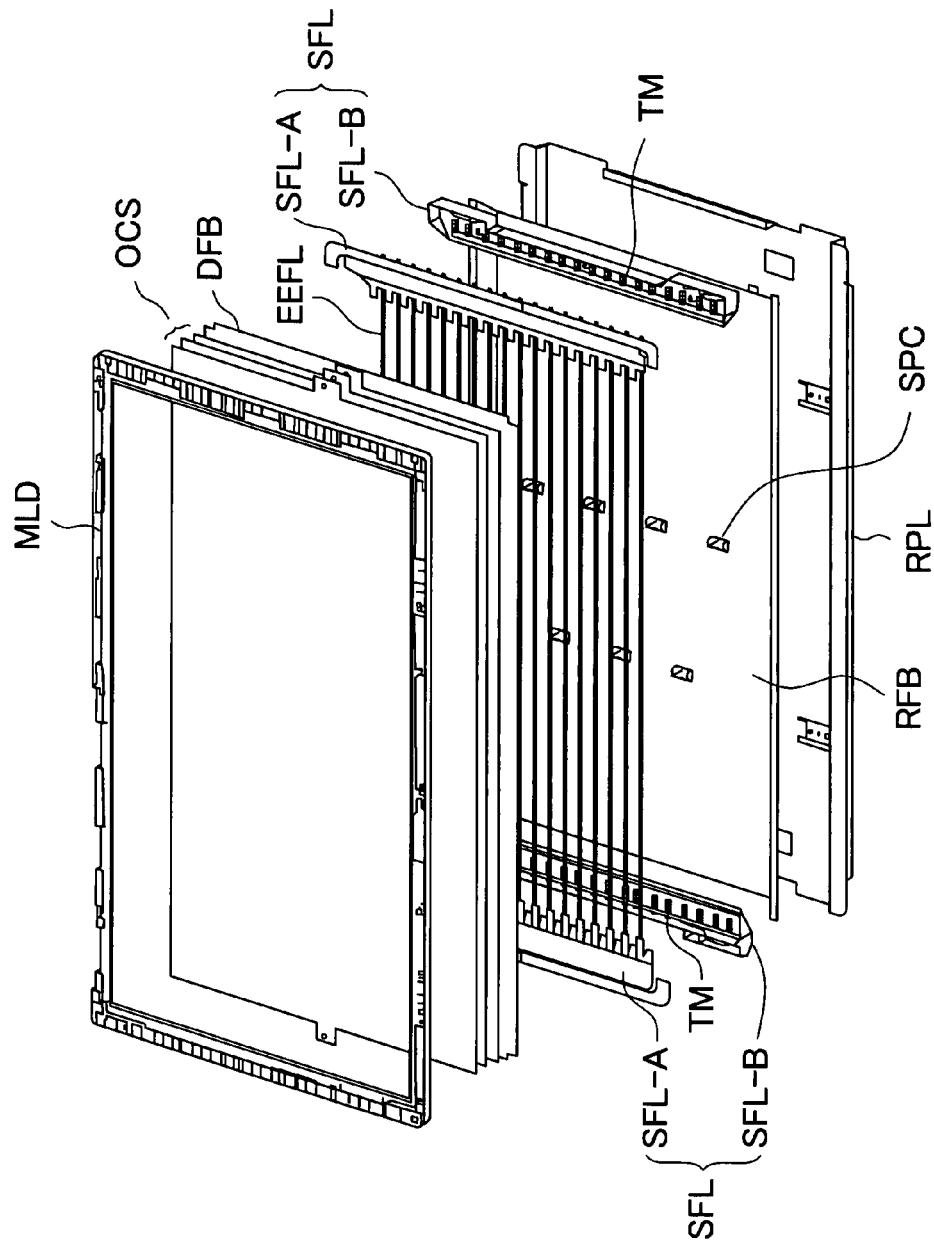
FIG. 1 is a developed perspective view for explaining an embodiment of a backlight structural body used in a liquid crystal display device according to the present invention.

Hereinafter, preferred embodiments of the present invention are explained in detail in conjunction with drawings which show the embodiments. Here, in the respective drawings for explaining embodiments described hereinafter, the same symbols are given to parts having identical functions and hence, unless otherwise particularly necessary, the repeated explanation is omitted. Further, in the drawings explained hereinafter, arrowed straight lines indicate a light reflection path.

Embodiment 1

FIG. 1 is a developed perspective view for explaining an embodiment of a backlight structural body used in a liquid crystal display device according to the present invention. The backlight structural body is of a direct-light type. The backlight structural body of this embodiment is configured such that between a back plate RPL and a mold frame MLD, a reflector RFB, side frames SFL, a diffusion plate DFB and an optical compensation sheet group OCS which is formed by stacking a prism sheet and a diffusion sheet are arranged. Here, each side frame SFL is constituted of a lower side frame SFL-B which includes electricity supply terminals TM which fixedly holds both ends of a plurality of external electrode fluorescent lamps EEFL constituting linear light sources and supply electricity, and an upper side frame SFL-A which includes eaves covering external electrode portions of the external electrode fluorescent lamps EEFL.

Here, in the backlight structural body having such a constitution, spacers SPC for suppressing non-uniformity of illuminance distribution attributed to the deflection of the large-sized diffusion plate DFB are mounted on the back plate RPL in an erected manner, and these spacers SPC are brought into contact with a back surface of the diffusion plate DFB through holes formed in the reflector RFB. Further, it may be also possible to provide the twig-like projection structure which suppresses the deflection of the elongated fluorescent lamp EEFL to the spacers SPC. A liquid crystal display panel not shown in the drawing is configured to be arranged on the mold frame MLD. Further, an inverter printed circuit board which controls the external electrode fluorescent lamps EEFL is mounted on a surface of the back plate RPL on a side opposite to a surface of the back plate RPL on which the fluorescent lamps are mounted.

In assembling the liquid crystal display device, the liquid crystal display panel and the backlight structural body are assembled in respective steps and, thereafter, the liquid crystal display panel is integrally formed on the backlight structural body in an overlapping manner. The backlight structural body can be obtained by assembling the plurality of members shown in FIG. 1. That is, the reflector RFB is placed on the back plate RPL, the lower side frame SFL-B is arranged on both left and right ends, the external electrode fluorescent lamps EEFL are set such that these external electrode fluorescent lamps EEFL span the electricity supply terminals TM of both lower side frames SFL-B, and portions such as the external electrodes and the electricity supply terminal TM are covered with the upper side frame SFL-A. The diffusion plate DFB is placed on the side frames SFL, the optical compensation sheet group OCS is stacked on the diffusion plate DFB and, thereafter, the frame-like mold frame MLD is arranged, and the whole parts are integrally fixed to each other using bolts or the like thus completing the direct-light-type backlight structural body. The liquid crystal display device is formed by overlapping the liquid crystal display panel not shown in the drawing to the direct-light-type backlight structural body.

Figure 2:
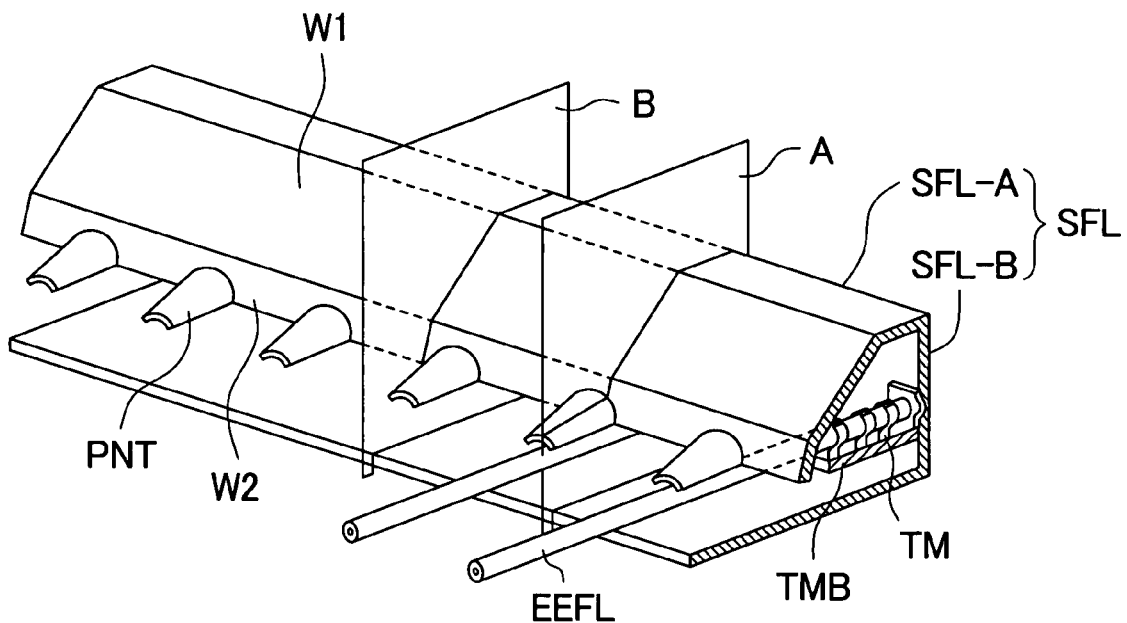
FIG. 2 is an enlarged view of an essential part of a side frame SFL in FIG. 1.

The backlight structural body of this embodiment is characterized in the structure of the side frames SFL in FIG. 1. This characterizing part is explained in conjunction with FIG. 2 to FIG. 4 hereinafter. FIG. 2 is an enlarged view of an essential part of a side frame SFL in FIG. 1, FIG. 3 is a cross-sectional view taken along a plane A in FIG. 2, and FIG. 4 is a cross-sectional view taken along a plane B in FIG. 2.

In the side frame SFL, an electricity supply electrode TMB on which the electricity supply terminals TM which connect the external electrodes EE of the plurality of external electrode fluorescent lamps EEFL in parallel and individually supply electricity are formed is arranged over a substantially whole length of the side frame SFL in the longitudinal direction. The electricity supply terminal TM is configured such that an electrode couple which is divided in a plural number (three in this embodiment) projects in the direction perpendicular to a paper surface in FIG. 3 for receiving the external electrode EE of the external electrode fluorescent lamp EEFL and resiliently holds the external electrode EE from both sides. Here, in FIG. 2, to prevent the drawing from becoming cumbersome, only two external electrode fluorescent lamps EEFL are mounted.

The upper side frame SFL-A includes a wall surface W1 having the inclination directed in the liquid crystal display panel direction, and a wall surface W2 extending toward an external electrode fluorescent lamp EEFL side from the wall surface W1 and having the inclination of an angle steeper than an angle of the wall surface W1. Eaves PNT which cover the external electrodes EE of the external electrode fluorescent lamps EEFL from above are formed on the wall surface W2. The eaves PNT of the embodiment 1 is formed in a half frusto-conical shape in which a frusto-conical shape projecting in the longitudinal direction of the external electrode fluorescent lamp EEFL from the upper side frame SFL-A and gradually decreasing a diameter thereof is cut in half by a plane parallel to the arrangement plane of the plurality of external electrode fluorescent lamps EEFL.

Figure 3:
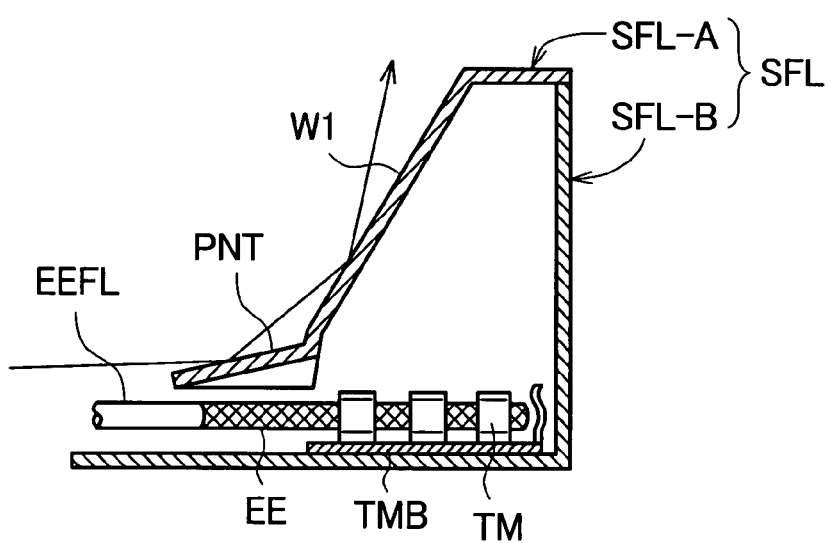
FIG. 3 is a cross-sectional view taken along a plane A in FIG. 2.
Figure 4:
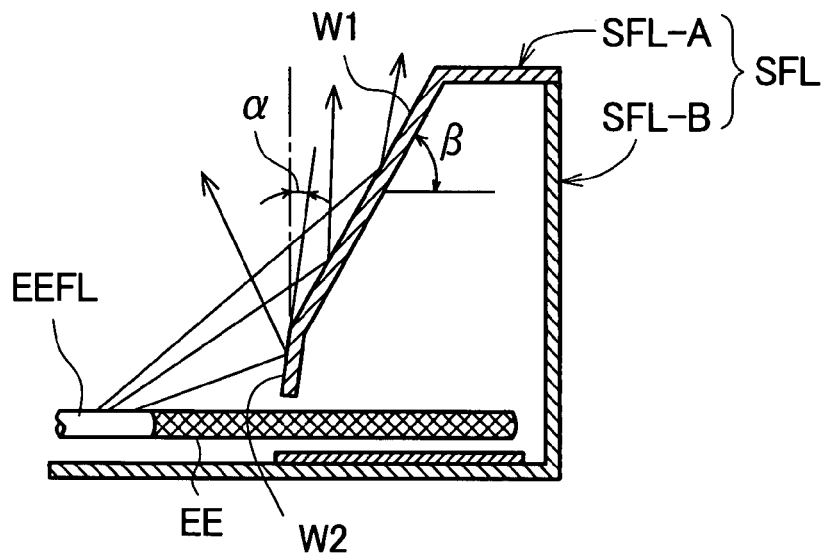
FIG. 4 is a cross-sectional view taken along a plane B in FIG. 2.

As shown in FIG. 3, the eaves PNT having the half frusto-conical shape cover the external electrode EE of the external electrode fluorescent lamp EEFL thus protecting an assembling operator from a high voltage applied to the external electrode EE. Further, the eaves PNT having the half frusto-conical shape have a function of reducing shortage of brightness of illumination light for the liquid crystal display panel at both ends of the external electrode fluorescent lamp EEFL by reflecting a portion of light emitted from the external electrode fluorescent lamp EEFL toward a liquid crystal display panel side or the wall surface W1 and the wall surface W2.

Further, as shown in FIG. 4, the wall surface W2 arranged between the eaves PNT having the half frusto-conical shape also has a function of reducing the shortage of brightness of illumination light for the liquid crystal display panel at both ends of the external electrode fluorescent lamp EEFL by reflecting a portion of light emitted from the external electrode fluorescent lamp EEFL to the liquid crystal display panel side.

Here, the angle β of the wall surface W1 and the angle α of the wall surface W2 of the upper side frame SFL-A may be selected such that the irregularities of brightness distribution of the illumination light for the liquid crystal display panel is decreased by taking a lamp axial length, an arrangement interval, brightness of the external electrode fluorescent lamps EEFL, a size of a region of the external electrode EE and the like into consideration.

According to the embodiment 1, it is possible to realize the liquid crystal display device having the favorable brightness distribution over the whole surface of the display region without ensuring a large picture frame of the liquid crystal display device. Further, in addition to the brightness improvement function of the external electrode region, it is possible to protect an operator from an electric shock which occurs due to a high voltage applied to the external electrode thus ensuring the safe assembling.

Embodiment 2

Figure 5:
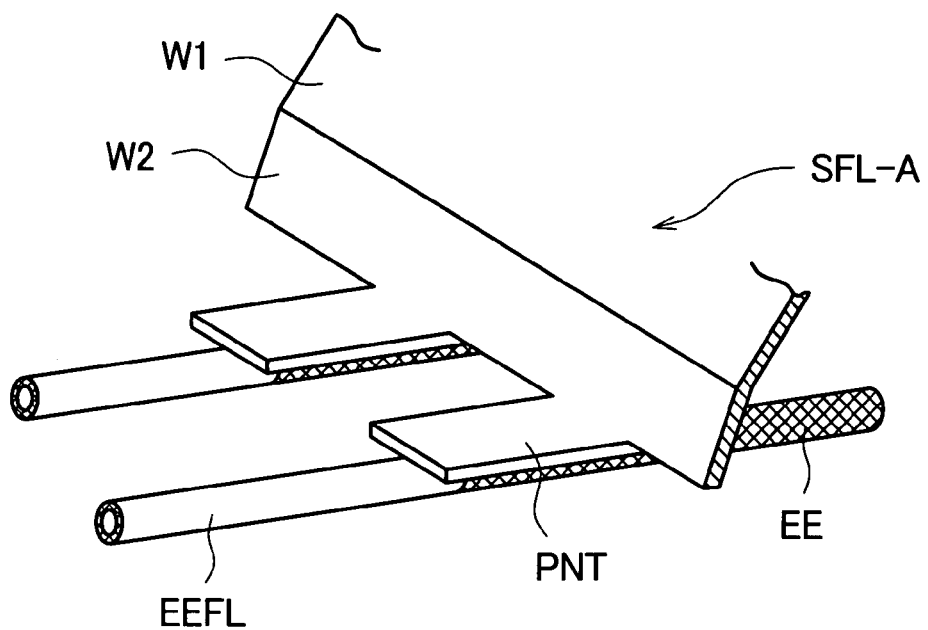
FIG. 5 is a perspective view of an essential part of an upper side frame for explaining an embodiment 2 of the liquid crystal display device of the present invention.

FIG. 5 is a perspective view of an essential part of an upper side frame for explaining an embodiment 2 of the liquid crystal display device of the present invention. Symbols which are equal to the symbols used in the explanatory views of the above-mentioned embodiment indicate identical functional parts. The embodiment 2 is characterized in that the above-mentioned eaves PNT are formed of rectangular flat plates which project from the upper side frame SFL-A in the longitudinal direction of the external electrode fluorescent lamps EEFL and are arranged parallel to an arrangement plane of the plurality of external electrode fluorescent lamps EEFL. The rectangular eaves PNT project in parallel to the external electrode fluorescent lamps EEFL from the lower end of the wall surface W2 of the upper side frame SFL-A for covering external electrodes EE. However, the eaves PNT may be inclined to gradually approach the external electrode fluorescent lamps EEFL from the lower end of the wall surface W2. Since other constitutions are substantially equal to the corresponding constitutions of the embodiment 1, their repeated explanation is omitted.

The embodiment 2 can also realize the liquid crystal display device having the favorable brightness distribution over the whole surface of the display region without ensuring a large picture frame of the liquid crystal display device. Further, in addition to the brightness improvement function of the external electrode region, it is possible to protect an operator from an electric shock which occurs due to a high voltage applied to the external electrode thus ensuring the safe assembling.

Embodiment 3

Figure 6:
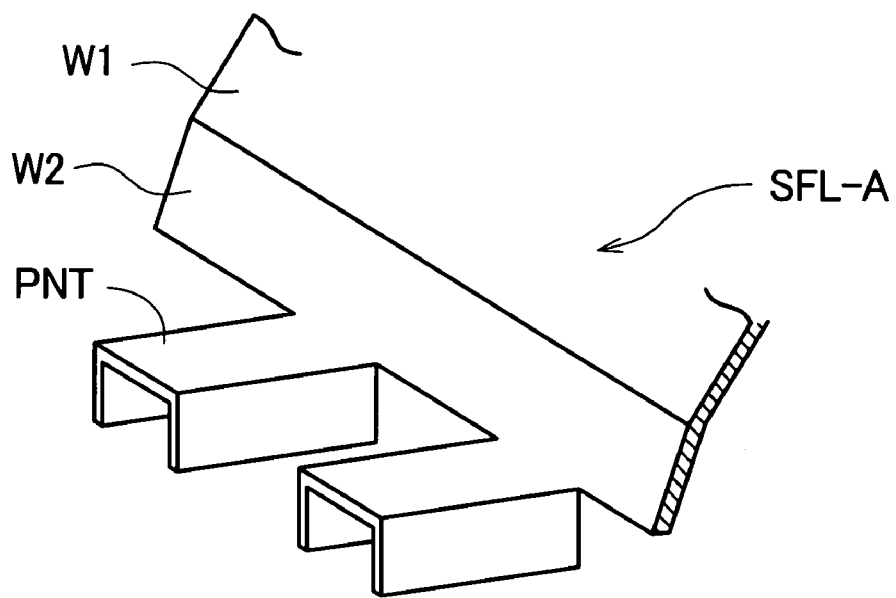
FIG. 6 is a perspective view of an essential part of an upper side frame for explaining an embodiment 3 of the liquid crystal display device of the present invention.

FIG. 6 is a perspective view of an essential part of an upper side frame for explaining an embodiment 3 of the liquid crystal display device of the present invention. Symbols which are equal to the symbols used in the explanatory views of the above-mentioned embodiment indicate identical functional parts. The embodiment 3 is characterized in that the above-mentioned eaves PNT are formed into a shape which includes an upper surface which projects in the longitudinal direction of external electrode fluorescent lamps EEFL from an upper side frame SFL-A and covers external electrodes EE of the plurality of external electrode fluorescent lamps EEFL from above and side surfaces which cover the external electrodes EE together with the upper surface.

The eaves PNT having such a shape project from the lower end of the wall surface W2 of the upper side frame SFL-A in parallel to the external electrode fluorescent lamps EEFL and cover the external electrodes EE. However, a bottom surface of the eaves PNT may be inclined to gradually approach the external electrode fluorescent lamps EEFL from the lower end of the wall surface W2. Since other constitutions are substantially equal to the corresponding constitutions of the embodiment 1, their repeated explanation is omitted.

The embodiment 3 can also realize the liquid crystal display device having the favorable brightness distribution over the whole surface of the display region without ensuring a large picture frame of the liquid crystal display device. Further, in addition to the brightness improvement function of the external electrode region, it is possible to protect an operator from receiving an electric shock which occurs due to a high voltage applied to the external electrode thus realizing the safe assembling.

Embodiment 4

Figure 7:
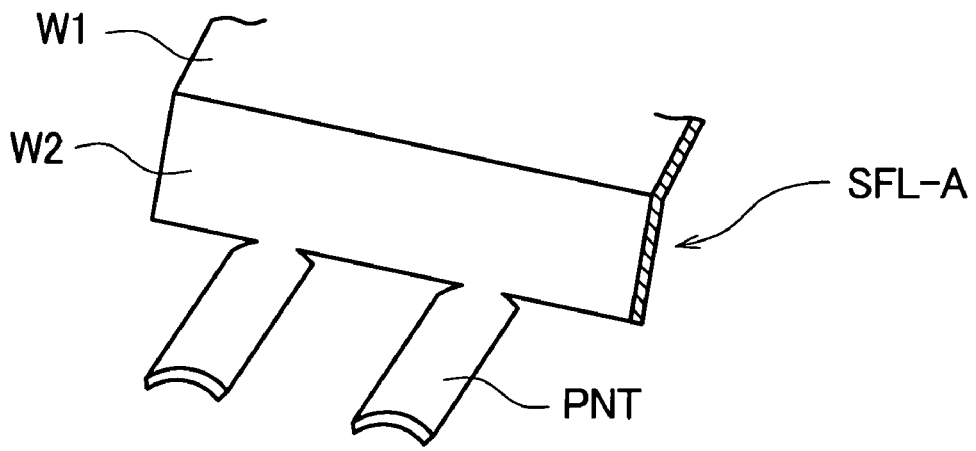
FIG. 7 is a perspective view of an essential part of an upper side frame for explaining an embodiment 4 of the liquid crystal display device of the present invention.

FIG. 7 is a perspective view of an essential part of an upper side frame for explaining an embodiment 4 of the liquid crystal display device of the present invention. Symbols which are equal to the symbols used in the explanatory views of the above-mentioned embodiment indicate identical functional parts. The embodiment 4 is characterized in that the above-mentioned eaves PNT are formed into an arcuate shape which projects from an upper side frame SFL-A in the longitudinal direction of external electrode fluorescent lamps EEFL and covers the external electrodes EE from above.

The eaves PNT having such an arcuate shape project from the lower end of the wall surface W2 of the upper side frame SFL-A in parallel to the external electrode fluorescent lamps EEFL for covering the external electrodes EE. However, the eaves PNT may be inclined to gradually approach the external electrode fluorescent lamps EEFL from the lower end of the wall surface W2. Since other constitutions are substantially equal to the corresponding constitutions of the embodiment 1, their repeated explanation is omitted.

The embodiment 4 can also realize the liquid crystal display device having the favorable brightness distribution over the whole surface of the display region without ensuring a large picture frame of the liquid crystal display device. Further, in addition to the brightness improvement function of the external electrode region, it is possible to protect an operator from an electric shock which occurs due to a high voltage applied to the external electrode thus realizing the safe assembling.

Embodiment 5

Figure 8:
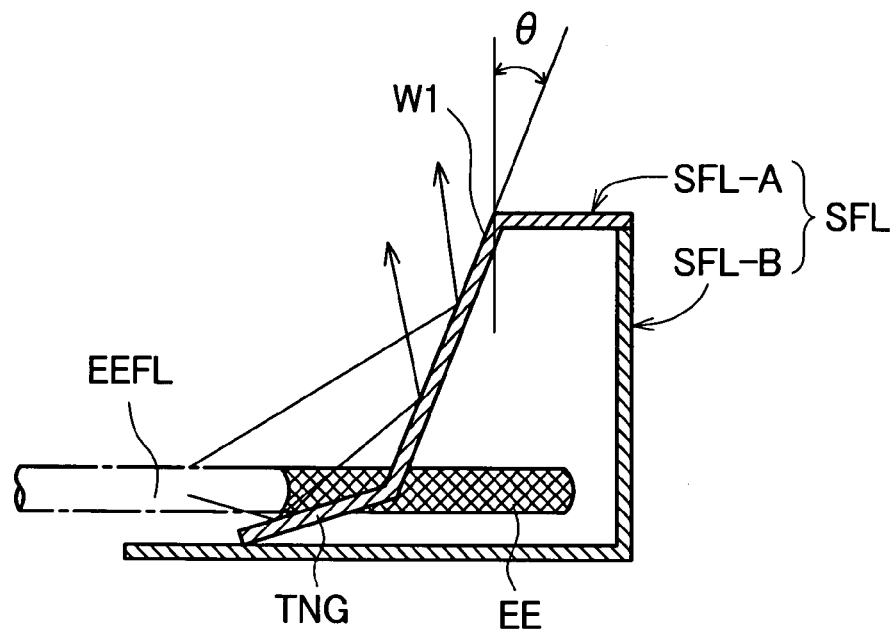
FIG. 8 is a cross-sectional view of an essential part of a side frame for explaining an embodiment 5 of the liquid crystal display device of the present invention.
Figure 9:
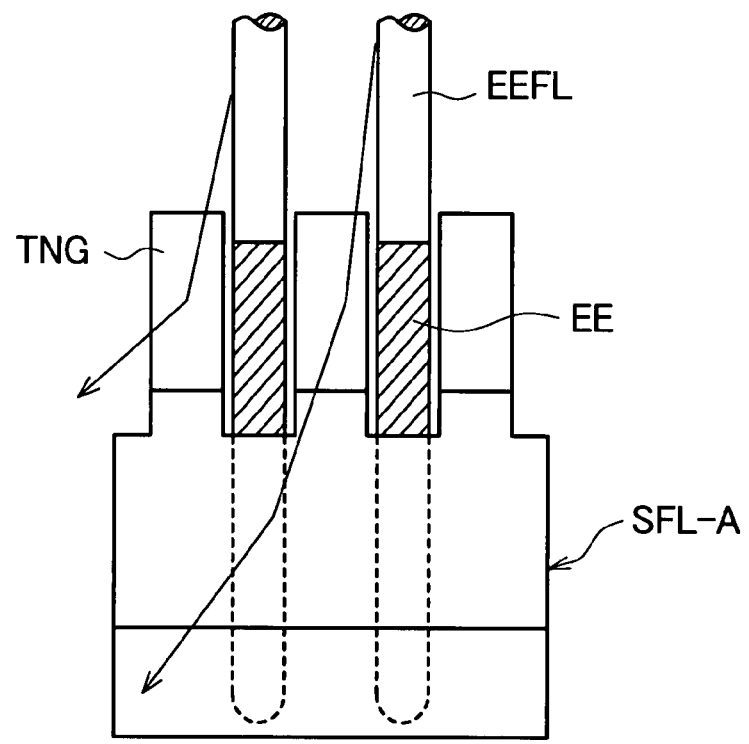
FIG. 9 is a top plan view of the side frame shown in FIG. 8.

FIG. 8 is a cross-sectional view of an essential part of a side frame for explaining an embodiment 5 of the liquid crystal display device of the present invention. FIG. 8 shows a cross section corresponding to the cross section B of the side frame SFL in FIG. 1. Further, FIG. 9 is a top plan view of the side frame shown in FIG. 8. The side frame SFL of the embodiment 5 is also constituted of a lower side frame SFL-B which fixes electricity supply terminals (not shown in the drawing) and an upper side frame SFL-A which covers external electrodes EE of the external electrode fluorescent lamps EEFL connected to the electricity supply terminals and is assembled to the lower side frame SFL-B.

The upper side frame SFL-A includes inclined portions TNG which extend to a position below an arrangement plane of the external electrode fluorescent lamps between the plurality of external electrode fluorescent lamps. The inclined portions TNG have a rectangular shape. As shown in FIG. 9, the rectangular inclined portion TNG passes between the external electrode fluorescent lamps EEFL from a lower end of a wall surface W1 of the upper side frame SFL-A and, as shown in FIG. 8, extends to the position below the arrangement plane of the external electrode fluorescent lamps EEFL. With the provision of these rectangular inclined portions TNG, a portion of light emitted from side surfaces of the external electrode fluorescent lamps EEFL reflects in the direction toward the wall surface W1 thus enhancing the brightness of regions of the external electrodes EE. Here, a portion of light emitted from the external electrode fluorescent lamps EEFL also reflects on the wall surface W1 thus enhancing the brightness of the regions of the external electrodes EE. Here, a wall surface W2 which is explained in conjunction with the embodiment 1 may be arranged between the wall surface W1 and the inclined portion TNG.

The embodiment 5 can also realize the liquid crystal display device having the favorable brightness distribution over the whole surface of the display region without ensuring a large picture frame of the liquid crystal display device.

Embodiment 6

Figure 10:
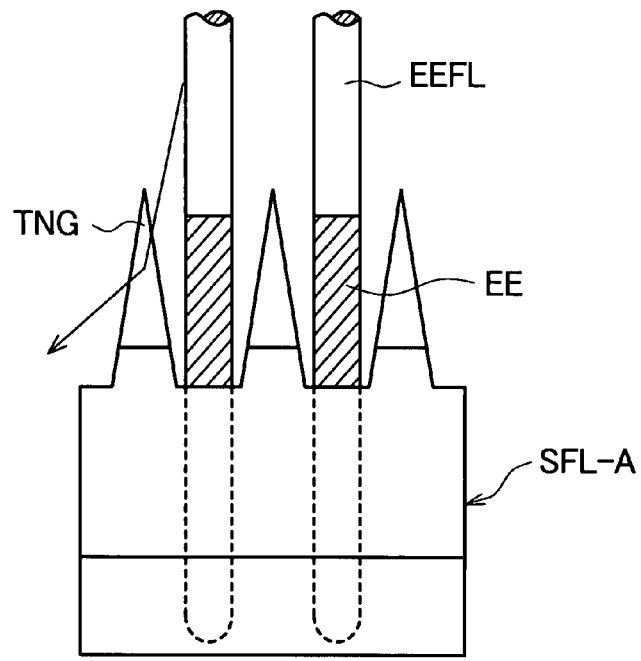
FIG. 10 is a top plan view of an essential part of a side frame for explaining an embodiment 6 of the liquid crystal display device of the present invention.

FIG. 10 is a top plan view of an essential part of a side frame for explaining an embodiment 6 of the liquid crystal display device of the present invention. FIG. 10 is a top plan view of the side frame SFL in the same manner as FIG. 9. The side frame SFL of the embodiment 6 is also constituted of a lower side frame SFL-B which fixes electricity supply terminals (not shown in the drawing) and an upper side frame SFL-A which covers external electrodes EE of external electrode fluorescent lamps EEFL connected to the electricity supply terminals and is assembled to the lower side frame SFL-B.

The embodiment 6 is characterized by forming the inclined portion TNG in the embodiment 5 into a serrated shape which narrows a width thereof toward a distal end thereof. By forming the inclined portion TNG into such a shape, light which is reflected on a reflector arranged below the external electrode fluorescent lamp EEFL is also used for improving the brightness at end portions of the external electrode fluorescent lamps EEFL. The manner of operation of this inclined portion TNG is substantially equal to the manner of operation of the inclined portion TNG in the embodiment 5. Here, in the same manner as the embodiment 5, the wall surface W2 explained in conjunction with the embodiment 1 may be provided between the wall surface W1 and the inclined portion TNG.

The embodiment 6 can also realize the liquid crystal display device having the favorable brightness distribution over the whole surface of the display region without ensuring a large picture frame of the liquid crystal display device.

Embodiment 7

Figures 11A, 11B, 11C:
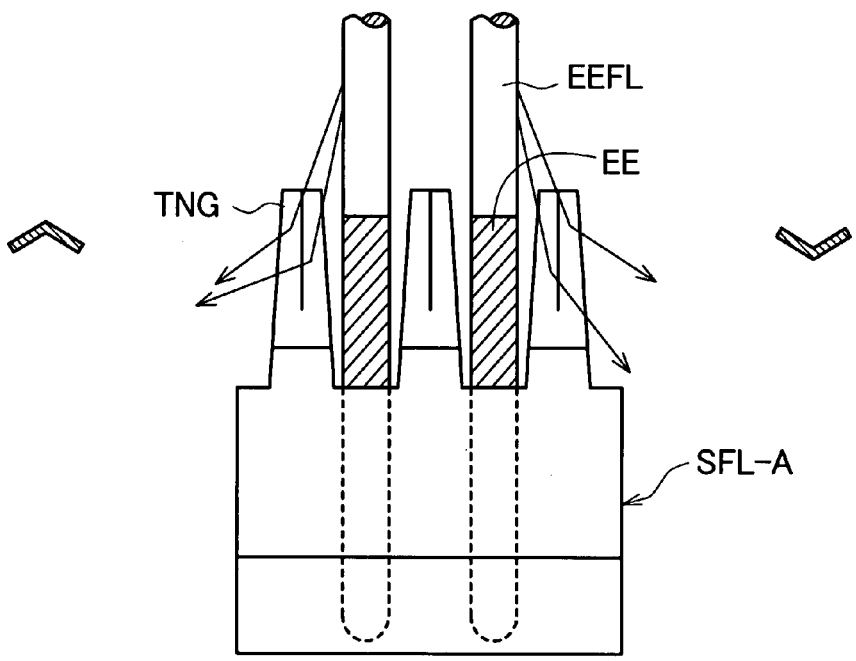
FIG. 11A to FIG. 11C are views showing an essential part of a side frame for explaining an embodiment 7 of the liquid crystal display device of the present invention.

FIG. 11A to FIG. 11C are views showing an essential part of a side frame for explaining an embodiment 7 of the liquid crystal display device of the present invention. FIG. 11A is a top plan view of the side frame SFL in the same manner as FIG. 9, and FIG. 11B and FIG. 11C are transverse cross-sectional views of an inclined portion in FIG. 11A. The side frame SFL of the embodiment 7 is also constituted of a lower side frame SFL-B which fixes electricity supply terminals (not shown in the drawing) and an upper side frame SFL-A which covers external electrodes EE of external electrode fluorescent lamps EEFL connected to the electricity supply terminals and is assembled to the lower side frame SFL-B.

The embodiment 7 is characterized in that the rectangular inclined portion TNG explained in conjunction with the embodiment 5 is configured to have a mountain-like cross section by bending a center portion of the rectangular inclined portion TNG of the embodiment. The mountain-like shape of the inclined portion TNG may be a normal mountain-like shape shown in FIG. 11B or an inversed mountain-like shape shown in FIG. 11C. By forming the inclined portion TNG in such a shape, it is possible to reflect a portion of light emitted from the external electrode fluorescent lamps EEFL in a scattered manner also in the arrangement direction of the external electrode fluorescent lamps EEFL thus making use of the portion of the light for improving the brightness at end portions of the external electrode fluorescent lamps EEFL. Here, in the same manner as the embodiments 5 and 6, the wall surface W2 explained in conjunction with the embodiment 1 may be provided between the wall surface W1 and the inclined portion TNG.

The embodiment 7 can also realize the liquid crystal display device having the favorable brightness distribution over the whole surface of the display region without ensuring a large picture frame of the liquid crystal display device.

Further, by combining the eaves of the respective embodiments and the inclined portions of the respective embodiments formed on the above-mentioned upper side frame, it is also possible to realize the further favorable compensation for brightness irregularities.

What is claimed is:
1. A liquid crystal display device, comprising:
    a liquid crystal display panel; and
    a backlight structural body which is mounted on a back surface of the liquid crystal display panel, wherein
    the backlight structural body includes:
    between a back plate and a frame-like mold frame,
    a plurality of external electrode fluorescent lamps which is arranged in parallel to each other, and
    a pair of side frames which includes electricity supply terminals which electrically connect electrode portions of the plurality of external electrode fluorescent lamps in parallel to each other,
    the side frame includes:
    a lower side frame which fixes the electricity supply terminals; and
    an upper side frame which is assembled to the lower side frame while covering the electrode portions of the exter- nal electrode fluorescent lamps which are connected to the electricity supply terminals, the upper side frame includes a wall surface, commonly covering electrode portions of the plurality of external electrode fluorescent lamps, having an inclination directed in the liquid crystal display panel direction, the upper side frame further includes eaves which project in the longitudinal direction of the external electrode fluorescent lamps in a state that the eaves individually cover the respective electrode portions of the external electrode fluorescent lamps, and wherein the eaves are formed into a half frusto-conical shape in which a frusto-conical shape projecting in the longitudinal direction of the external electrode fluorescent lamp from the upper side frame and gradually decreasing a diameter thereof is cut in half by a plane parallel to an arrangement plane of the plurality of external electrode fluorescent lamps.

2. A liquid crystal display device according to claim 1, wherein the eaves are formed into a rectangular flat plate which projects from the upper side frame in the longitudinal direction of the external electrode fluorescent lamp.

3. A liquid crystal display device according to claim 1, wherein the eaves are formed into a shape which includes an upper surface which projects from the upper side frame in the longitudinal direction of the external electrode fluorescent lamp and covers the external electrode from above and side surfaces which cover the external electrode together with the upper surface.

4. A liquid crystal display device according to claim 1, wherein the eaves are formed into an arcuate shape which projects from the upper side frame in the longitudinal direction of the external electrode fluorescent lamp and cover the external electrode from above.

5. A liquid crystal display device, comprising:

a liquid crystal display panel; and a backlight structural body which is mounted on a back surface of the liquid crystal display panel, wherein the backlight structural body includes:

between a back plate and a frame-like mold frame., a plurality of external electrode fluorescent lamps which is arranged in parallel to each other; and a pair of side frames which includes electricity supply terminals which electrically connect electrode portions of the plurality of external electrode fluorescent lamps in parallel to each other, the side frame includes:

a lower side frame which fixes the electricity supply terminals; and an upper side frame which is assembled to the lower side frame while covering the electrode portions of the external electrode fluorescent lamps which are connected to the electricity supply terminals, the upper side frame includes a wall surface, commonly covering electrode portions of the plurality of external electrode fluorescent lamps, having an inclination directed in the liquid crystal display panel direction, and the upper side frame further includes eaves which project in the longitudinal direction of the external electrode fluorescent lamps in a state that the eaves individually cover the respective electrode portions of the external electrode fluorescent lamps, and inclined portions which extend to a position below an arrangement plane of the plurality of external electrode fluorescent lamps between the plurality of external electrode fluorescent lamps, and wherein an inclination angle of the inclined portion is less steep compared with an inclination angle of the wall surface, wherein the eaves are formed into a shape selected from a group consisting of a half frusto-conical shape in which a frusto-conical shape projecting in the longitudinal direction of the external electrode fluorescent lamp from the upper side frame and gradually decreasing a diameter thereof is cut in half by a plane parallel to an arrangement plane of the plurality of external electrode fluorescent lamps, a rectangular flat plate which projects from the upper side frame in the longitudinal direction of the external electrode fluorescent lamp, a shape which includes an upper surface which projects from the upper side frame in the longitudinal direction of the external electrode fluorescent lamp and covers the external electrode from above and side surfaces which cover the external electrode together with the upper surface, and an arcuate shape which projects from the upper side frame in the longitudinal direction of the external electrode fluorescent lamp and covers the external electrode from above.

6. A liquid crystal display device according to claim 5, wherein the inclined portion is formed into a rectangular shape.

7. A liquid crystal display device according to claim 5, wherein the inclined portion has at least a portion of a cross section thereof formed into a mountain-like shape.

* * * * *